US005414781A

United States Patent [19]

Spitz et al.

[11] Patent Number: 5,414,781

[45] Date of Patent: May 9, 1995

[54] METHOD AND APPARATUS FOR CLASSIFYING DOCUMENTS

[75] Inventors: A. Lawrence Spitz, Palo Alto; Lynn D. Wilcox, Portola Valley, both of Calif.

[73] Assignee: Xerox Corporation, Stamford, Conn.

[21] Appl. No.: 158,831

[22] Filed: Nov. 24, 1993

Related U.S. Application Data

[63] Continuation of Ser. No. 803,253, Dec. 5, 1991, abandoned.

[51] Int. Cl.[6] .......... G06K 9/32

[52] U.S. Cl. .......... 382/296; 382/317

[58] Field of Search .......... 382/45, 46, 41, 56, 382/61; 358/452, 406, 468, 261.2, 261.3

[56] References Cited

U.S. PATENT DOCUMENTS

| | | | |
|---|---|---|---|
| 4,021,777 | 5/1977 | Shepard | 382/61 |
| 4,400,737 | 8/1983 | Arai et al. | 382/16 |
| 4,499,499 | 2/1985 | Brickman et al. | 358/263 |
| 4,555,802 | 11/1985 | Fedak et al. | 382/56 |
| 4,614,978 | 9/1986 | Doster et al. | 358/263 |
| 4,941,189 | 7/1990 | Britt | 382/46 |
| 4,965,744 | 10/1990 | Wagatsuma et al. | 364/518 |
| 5,001,766 | 3/1991 | Baird | 382/46 |
| 5,001,769 | 3/1991 | Reid-Green et al. | 382/61 |
| 5,010,580 | 4/1991 | Vincent et al. | 382/17 |
| 5,038,393 | 8/1991 | Nanba | 382/46 |
| 5,133,026 | 6/1992 | Fujiwara et al. | 382/46 |
| 5,245,676 | 9/1993 | Spitz | 382/46 |
| 5,247,591 | 9/1993 | Baran | 382/61 |

OTHER PUBLICATIONS

International Digital Facsimile Coding Standards Roy Hunter and A. Harry Robinson Proceedings of the IEEE, vol. 68, No. 7, Jul. 1980, pp. 854–867.

Baird "The Skew Angle of Printed Documents" Preceedings of the SPSE Symposium on Hybrid Imaging System, pp. 21–24, 1987.

*Primary Examiner*—Yon J. Couso

*Attorney, Agent, or Firm*—Rosen, Dainow & Jacobs

[57] ABSTRACT

A method and apparatus for identifying documents and classes of documents. The documents are provided with distinctive logotypes which are preferably at the top of each document. The coding of the logotypes is by the use of distinctive angular alignments in the logotype. The logotype is scanned at different angles in order to determine angular "signatures" for comparison with a predetermined power distribution.

14 Claims, 9 Drawing Sheets

METHOD AND APPARATUS FOR CLASSIFYING DOCUMENTS

This application is a continuation of application Ser. No. 07/803,253, filed Dec. 5, 1991, now abandoned.

FIELD OF THE INVENTION

This invention relates to a method and apparatus for classifying documents, for example to identify different classes or individual documents, by the use of a "signature" embedded in the document.

BACKGROUND OF THE INVENTION

U.S. Patent application Ser. No. 07/454,339 filed Dec. 21, 1989, assigned to the present assignee, discloses a method for the detection of the predominant alignment of a page containing text and/or graphics. The contents of this copending application are incorporated herein by reference. The technique described in the copending application computes the "power" of an alignment angle based upon the locations of the pass codes in the CCITT G4 image. This technique uses, as fiducial marks, the locations of the pass codes which result in the output of runs of white pixels. A large power at a given angle signifies the alignment of the pass codes at that orientation.

Since an understanding of the techniques employed in the method of said copending application are of value in the understanding of the present invention, the technique thereof will now be described with reference to FIG. 1-6 of the drawings of the present application.

FIG. 1 is a block diagram illustrating the format of an environment in which the method of the copending application, as well as that of the present invention may operate. This block diagram illustrates a portion of a computer system 50 that includes or is connected to receive output signals from a scanner 52 capable of scanning an image and producing digital data which represents that image. This digital data is communicated to a processor 54. The processor controls input and output operations and calls to program memory 56 and data memory 58 via bus 60.

Program memory 56 may include, inter alia, a routine 62 for controlling the scanning of an image by scanner 62, a routine 64 for converting the digital data representing the image into a compressed data format, and a routine 66 for determining skew angle from the compressed data. Program memory 56 thus has a data memory 58 which stores, at location 68, the digital data structure produced by scanner 52 under control of the scanning control routine 62, at location 70 the data structure of the compressed representation of the scanned image produced by compression routine 64, and at location 72 the data structure containing selected point data, for example fiducial point location, produced by skew angle determination routine 66. To facilitate the communication between program memory 56 and data memory 58 necessary for operation, each are connected to bus 60 such that input and output operations may be performed. It is of course apparent that memories 56 and 58 may constitute a single memory block.

Under control of the processor, skew detection routine 66 accesses various parts of the data memory 58 to acquire data needed to calculate skew angle. Once calculated, the skew angle may then be applied to the output at 74, which may comprise means for displaying the results such as a CRT display, hard copy printer or the like, or may comprise a means for utilizing the results to perform further operations, such as modification of the image data to compensate for skew, etc.

It has been assumed that the image data has been compressed according to the Group 4 standard, although the technique can be modified to render similar results using other compression techniques, such as CCITT 2-dimensional Group 3 format, etc. The coding scheme of Group 4 relies upon the existence and relative spacing between pixel color transitions found on pairs of succeeding scan lines. In Group 4 coding, each line in turn becomes a "coding line" and is coded with respect to its predecessor, the "reference line". The first line is coded with respect to an artificially defined all white reference line. The Group 4 compression standard is explained in greater detail in "International Digital Facsimile Coding Standards", Hunter et al, Proceedings of the IEEE, Vol 68, No. 7 July 1980, pp 854–867 and Int'l Telecommunications Union, CCITT (Int'l Telegraph and Telephone Consultative Committee) Blue Book, Geneva 1989 (I 92-61-03611-2).

Encoding in the Group 4 format has 3 modes—vertical, horizontal and pass. In order to determine the current mode, adjacent scan lines are compared to determine whether, given a first pixel color transition on the reference line, such as black to white, there exists a corresponding pixel color transition (i.e. also black to white) on the coding line. The existence and relative spacing of the transition on the coding line from the transition on the reference line is employed to determine the mode.

Thus, FIG. 2*a* illustrates a vertical mode, wherein the black to white or white to black transition positions on adjacent scan lines are horizontally close (equal to or less than three pixels, i.e., a, b, $\leqq 3$). FIG. 2*b* illustrates a horizontal mode, wherein the transition positions are further apart than 3 pixels. The pass mode is illustrated in FIG. 2*c*, wherein a transition on the reference line does not correspond to any transition on the coding line. The compressed data includes, inter alia, a mode code together with a displacement which implies a displacement measured on the reference line as opposed to the coding line, i.e., $a_1$ to the right of $b_2$.

The coding can be explained more clearly with respect to FIGS. 3 and 4. In FIGS. 3*a* and 3*b*, the fiducial points 76 are located on the basis of topographic features of the different marks. These topographic features are always located on the marks themselves. Specifically, skew is determined from the locations of the pass codes in Group 4 compressed representation of the image. The position of the pass code fiducial point 76 on unskewed and skewed text are shown by the X marks in FIGS. 3*a* and 3*b*, respectively.

Since all of the pass codes (i.e. codes corresponding to the pass mode) are defined relative to a point on the respective mark, all fiducial points are located at some point on the mark, regardless of the extent of the skew. In addition, since there may be more than one pass code in the compressed data representing a mark, there may be more than one fiducial point per mark. For example, for typical font styles, passes will be generated in two places along the baseline of many characters including upper and lower case "A", "H", "K" etc., and in three places along the baseline of an upper and lower case "M".

Passes may also be generated as a result of aliasing errors, for example as shown on the underside of the crossbar of the unskewed "G" and on the right leg of the unskewed "K", in FIG. 3. Distinguishing such aliasing errors is not of importance to the present discussion.

There are two types of passes, i.e. white passes which represent a passage from black pixels to white pixels, and black passes which represent a passage from white pixels to black pixels. White passes are thus indicative of the bottoms of black structures, and are hence somewhat analogous to the bottoms of connected components in the raw bitmap, such as line ends. It is thus guaranteed that there is at least one white pass at the bottom of each connected component. It is accordingly advantageous to use white passes as the fiducial points in the scanning of text or characters, although it will be apparent that black passes may alternatively be employed to determined skew angle. The positions of the white pass code fiducial points 78 on unskewed and skewed text are shown as arrows in FIGS. 4*a* and 4*b* respectively.

The Group 4 encoding of passes does not distinguish between white passes and black passes. This may be determined, however, by maintaining the color state. Color state can be maintained by a binary state bit which is initialized to white. Subsequent events including a pass code occurrence may cause the state bit to invert, thereby keeping a running track of the desired pass color.

Comparing FIGS. 3*a*, 3*b* and FIGS. 4*a*, 4*b*, it is seen that fewer fiducial points are generated off the baseline of the text in FIG. 4 than in FIG. 3. Thus, white passes are advantageous in providing fiducial points on which to base skew measurements by alignment.

FIG. 5 is a flow diagram of a skew detection routine 66 that may be employed in order to determine the skew in a document. This diagram assumes that an image has been scanned, that digital data has been produced corresponding to the scanned image, and that digital data has undergone compression according to a selected data compression method such as that producing Group 4 compressed data.

Initially (box 92), the white pass codes in the data structure of compressed image data are located. Once a white pass code is located, its location in an appropriate coordinate system is determined (box 94). The data may be stored as x,y coordinates. A test is then made (box 98) to determine whether the end of the scanned page has been reached. If so, the skew angle determination proceeds. Otherwise, as search is made for the next, if any, white pass code on the given page.

The steps of boxes 92–98 are collectively referred to as a coordinate determination routine which is disclosed in greater detail with respect to FIG. 6. In this flow diagram, box 101 illustrates the input of data in the Group 4 compressed format. Using x,y coordinate pairs, x and y are first initialized to 0 to indicate the start of each new page (box 102).

The Group 4 codes are detected (box 103), and tests are made to detect horizontal codes (box 104) and vertical codes (box 112). It is assumed that all other codes are pass codes. The detection of the different codes may be implemented by character string recognition, as above discussed. If the detected code is a horizontal code, the x value is increased by the x displacement value associated with the horizontal code (box 106). That is, the horizontal mode of Group 4 includes a code indicating the mode and a displacement indicating the number of pixels between the reference pixel color transition and the current pixel color transition. In the case of a horizontal code, the displacement is the number of pixels between a pixel color transition on the particular line and the next pixel color transition on that same line.

The new value of x does not become an abscissa value used to determined alignment, but is a running value of the displacement from the first pixel position on a scan line. In the method of the copending application, only white pass codes are used for alignment determination.

Assuming that a horizontal code is detected, the binary pixel color state bit is then incremented (box 122). Once the new value of x has been calculated, it is checked (box 108) to determine if the line end has been reached, for example by comparing x to the known length of the scan line. If the line end has not been reached, code detection continues for that line (box 103). If the line end has been reached, x is set to 0 (box 110) to correspond to the beginning of the next line and y, which keeps a running count of the line number, is incremented by one and checked (box 111) to determine if the page end has been reached. The page end may be detected by comparing the y value with the known number of lines on the page. If a page end has been reached, power is then determined for various alignments swept through a number of alignments angles (box 126), as will be discussed. If the page end has not been reached, code detection resumes (box 103).

If the detected code is not a horizontal code, it is tested (box 112) to determine if it is a vertical code. If a vertical code is found, the x value is determined and the program proceeds in a manner similar to that when a horizontal codes was found.

If the code is neither a horizontal code nor a vertical code, it is assumed to be a pass code. Group 4 does not distinguish between black and white pass codes, but the type of pass code may be distinguished by keeping track of the binary pixel color state bit at box 118. Initially the state bit has been set to 0 (box 102). Arbitrarily, 0 has been chosen to correspond to white pass codes. Each time a code is detected, the state bit is checked. If the state bit is not equal to 0, i.e. if the pass code is not a white pass code, the new value of x is set to equal the old value of x (box 120). Assuming that the next code encountered is not a pass code, the next code will have associated with it the requisite information needed to properly calculate the next value of x. If the next code encountered is a pass code, the process is repeated until a code is encountered which is not a pass code. This is the essence of a Group 4 pass code. Continuing, the new value of x has been set (box 120), and the state bit is incremented (box 122) for the next encountered pass code.

If the state bit is 0, a white pass code has been encountered. The location of the white pass is maintained in order to calculate power of the alignment, and for the transformation steps that will be discussed below. This may be done at selected point data location 72 in the data memory 58 of FIG. 1. The maintenance of the locations of the white pass codes is performed at box 124. Next, the value of x is set, the state bit incremented, and the program tests for line and page ends, as discussed above.

Returning now to FIG. 5, assuming that line and page ends have been found, the program section 126 determines power for a plurality of alignments. Initially the alignment angle is set to 0 (box 128). This alignment corresponds to the alignment at which the image was initially scanned. The power of this alignment is calculated, for example by summing the number of passes detected at each of a plurality of different heights (e.g. each corresponding to $\frac{1}{3}$ of the height of a six point character), the heights extending along lines perpendicular to the alignment direction being tested. The calculation of power is made more efficient by calculating the alignment on the basis of the sum of a positive power greater than 1 (e.g. 2) (sum of squares) of the counts of the passes which appear in each of the rotationally aligned height increments. The variance of the distribution is maximized by maximizing the sum of squares of the counts, resulting in an index of the "power" of the alignment from which the skew angle is determined. Such power calculation is discussed, for example, in "The Skew Angle of Printed Documents" Henry S. Baird, Proceedings of SPSE Symposium on Hybrid Imaging Systems, 1987, pp 21–24, the contents of which are incorporated herein by reference.

In accordance with the copending application, in the determination of power, a call may be made to memory location 72 of the data memory 58 and the number of x values stored therein determined for each line. The square of the number of x values for each line is accumulated in an array (box 130) representing the power of the alignment at the current alignment angle. The array of squares is stored, together with the current alignment angle (box 132), which may be a part of the data memory 58.

The alignment angle is now incremented by a selected amount, for example one degree (box 134). The power of the alignment is determined for alignments with a range of alignment angles. Selection of the range of alignment angles depends upon a number of factors, such as the expected range of alignment angles, the expected strength of the alignments, the expected number of alignments, etc. The greater the range of alignment angles, the greater the computation time for a given angle increment. For example, the range of skew angles tested may be +40 degrees to −40 degrees. Once incremented, the current alignment angle is tested to determine whether it falls within the selected range (box 136). If the current alignment is within the selected range, the locations of the white pass codes are translated (box 138). Several method of translating the locations of the pass codes exist, and their applicability depends on the coordinate system used, the memory size available, the speed of calculation required, etc.

If the current alignment angle falls outside of the selected range, the maximum power may be determined (box 140) by comparing the powers of the various alignments previously stored. The maximum power may then be output (box 142) in a wide variety of formats, for example in the form of the absolute angle, a spectrum of angles together with their powers, etc. The format of the output depends on the intended use of the results.

U.S. Pat. No. 5,001,766 discloses a method and apparatus for distributing and correcting rotational error (skew) between the dominant orientation of an image and a reference line by generating a file of picture elements representing the image with respect to the reference line, projecting the picture elements into contiguous segments of imaginary lines at selected angles across the file, counting the number of picture elements that fall into the segments and finding the projection that generates the largest value of an enhancement function applied to the segment counts.

SUMMARY OF THE INVENTION

The invention is directed to the provision of a method and apparatus for identifying document classes by the use of distinctive logotypes which can be detected in either the compressed domain or the uncompressed domain, and the provision of means for practicing the method. The logotypes are characterized in that they have angular alignments implicit in them which give rise to "alignment signatures" which are significantly different from signatures of documents that do not have such logotypes.

The logotypes are preferably comprised of spatially ordered sets of alignment structures, each of which generates a known and repeatable pattern of pass codes in the CCITT Group 4 encoding. While a minimum of three sets of alignment structures are theoretically required, substantially more than three are preferred, for example, 20 or more depending primarily on image noise, rotation (skew) and detectability of logotypes from user message. In the presence of usually expected levels of noise, 80 chevron-type alignment structures has been found to be acceptable. Analysis of the "color" and distribution of the locations of the pass codes gives rise to an alignment signature characteristic of individual logotypes. The signatures of input documents are compared with known statistics for documents of the desired class.

The logotype is preferably, although not necessarily, provided at the top of a document. The logotype detection technique also preferably uses the power of alignment angles generated from the compressed image. A signature of an image is generated by computing the power at a range of alignment angles. If the signature matches the signature of a known logotype, the logotype is detected.

BRIEF DESCRIPTION OF THE DRAWINGS

In order that the invention may be more clearly understood, it will now be disclosed in greater detail with reference to the accompanying drawings, wherein.

DETAILED DISCLOSURE OF THE INVENTION

In accordance with the invention, a logo or logotype is imprinted or otherwise provided on a document. The logotype includes embedded data, i.e. a "signature", which will be more fully described in the following paragraphs, that enable the document to be identified by data scanning techniques. This technique enables classification of documents. The identification can be effected with or without decompression of the document. The "signature" has determinable alignment characteristics that enable determination of the "signature" by techniques similar to those described above with respect to the copending application.

The logotype which is provided on the document, in accordance with the invention, is comprised of one or more alignment marks or structures. The alignment marks can take on any shape having predictable, noise resistant, and skew resistant pass location characteristics. In general this means the avoidance of horizontal surfaces.

Figure 7A:
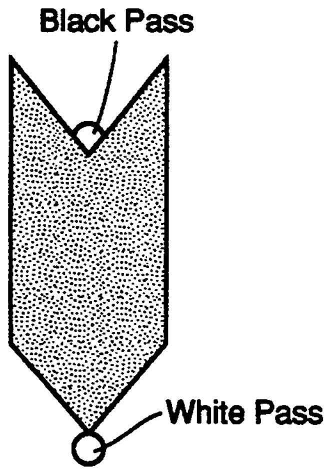
FIGS. 7*a* and 7*b* illustrate chevrons which may be used as alignment structures in the invention.
Figure 7B:
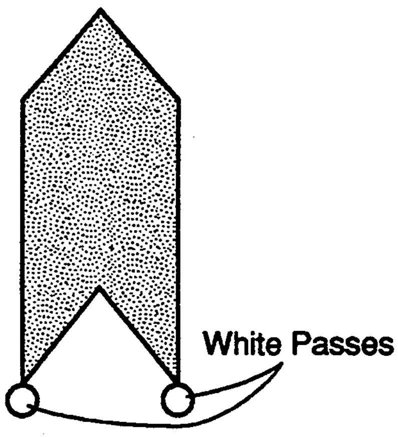

As an example, the logotypes may be composed using one or more chevron-shaped structures, such as illustrated in FIGS. 7*a* and 7*b*. Point-down chevrons as shown in FIG. 7*a* have the advantage of resulting in the generation of a single black pass near the top of the structure and a single white pass at the bottom the structure. The alignment angle is independent of vertical displacement.

The basic alignment of the alignment marks are preferably consistent with the (textual) material on the page, in order to enable calculation of signature verification on the basis of the alignment distribution relative to the principal alignment.

The alignment structures, of which the logotype is constructed, have predictable pass code generation characteristics. The pass code generation characteristics should be robust in the face of small angle rotation resulting from skew and be relatively noise immune. Since, in accordance with the invention, pass codes are generated for runs of both black and white pixels, it is desirable to use alignment structures which generate both modes of pass code.

A chevron pointed upward, however, as shown in FIG. 7*b*, generates two white passes at the bottom and no black passes. Accordingly a structure such as shown in FIG. 7*b* is not preferred in the method and apparatus of the invention.

By using a 45 degree angle (with the nominal vertical) to form the structures which generate the pass codes, alignment structures such as these are immune to generation of spurious pass codes due to small angle skew of the document.

Logotypes in accordance with the invention are constructed from known and controlled geometric arrangements of alignment structures. The logotype should be as robust as possible in terms of suppression of spurious pass codes as well as in the generation of strong (relative to non-logotype) alignments. By controlling the length (height) of the alignment structures, a fixed angular relationship between the alignments of the black and white passes can be maintained.

Figure 8:
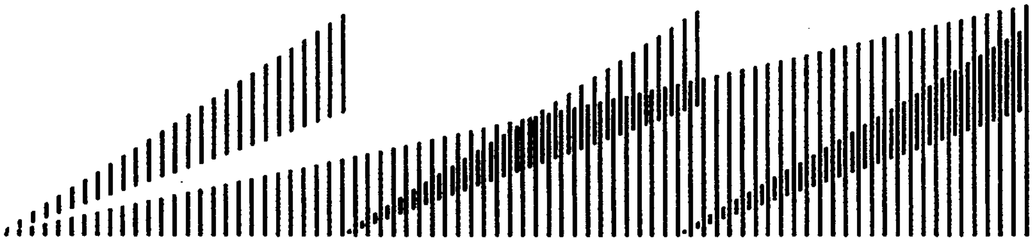
FIG. 8 is an illustration of a suitable logotype in accordance with the invention.
Figure 9:
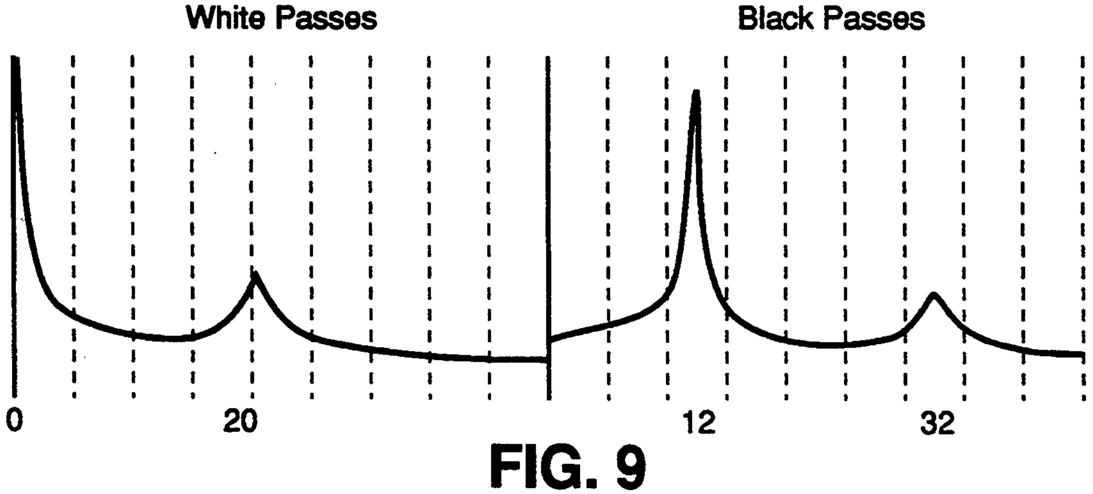
FIG. 9 illustrates the white pass and black pass signatures of the logotype of FIG. 8.

An example of a suitable logo is shown in FIG. 8. This logo will generate four separate peaks in its alignment signature. White passes will align at 0 and 20 degrees and black passes will align at 12 and 32 degrees, as illustrated in FIG. 9.

Figure 1:
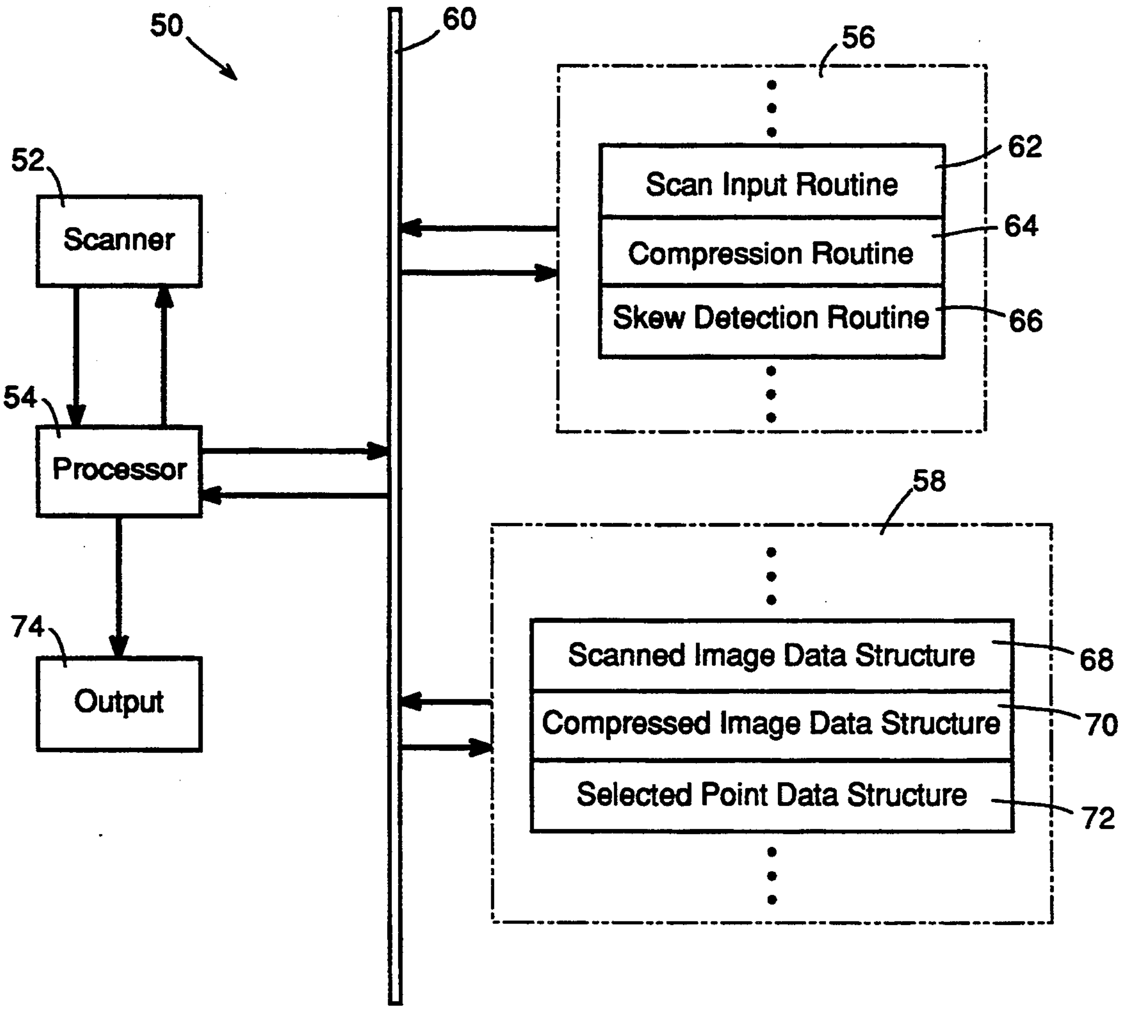
FIG. 1 Prior Art
FIG. 1 is a block diagram of a computer system that may be employed by the present invention as well as that of the copending application.
Figure 2A:
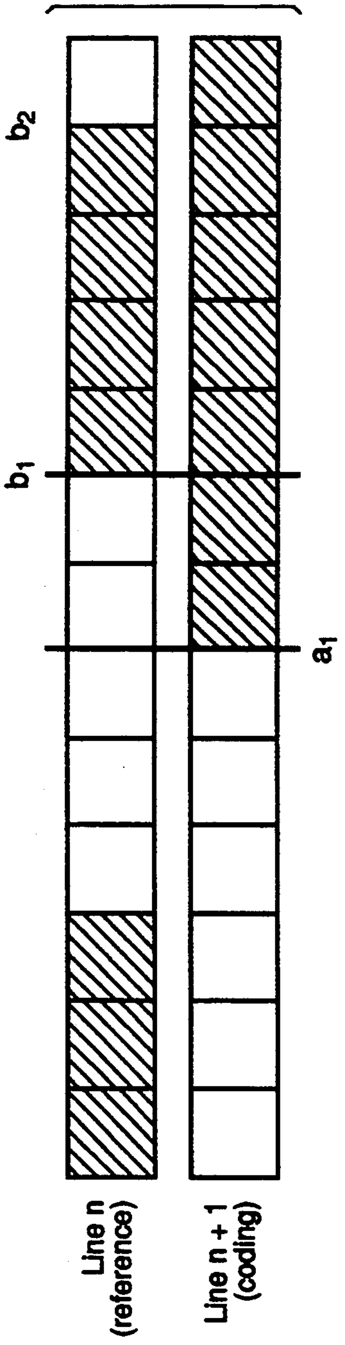
FIG. 2a Prior Art
FIGS. 2*a*, 2*b* and 2*c* illustrate prior art encoding modes of the CCITT Group 4 compression standard.
Figure 2B:
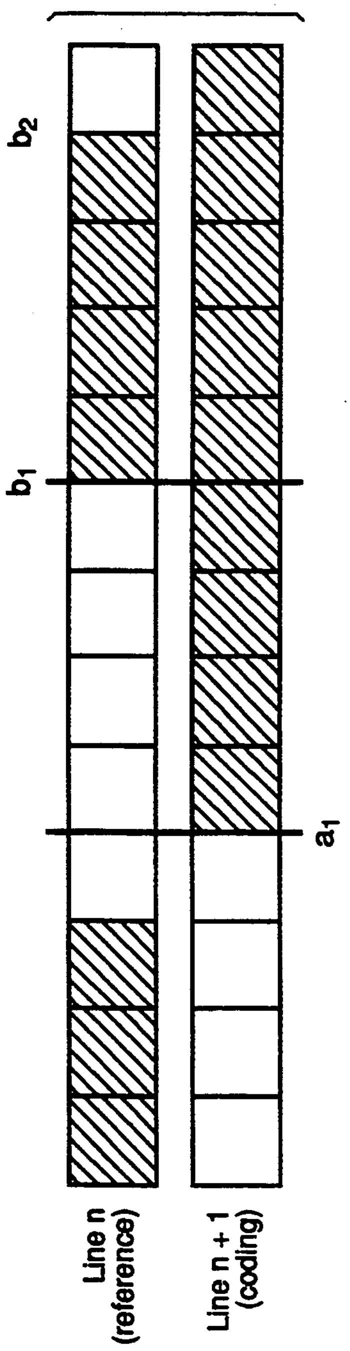
FIG. 2b Prior Art
Figure 2C:
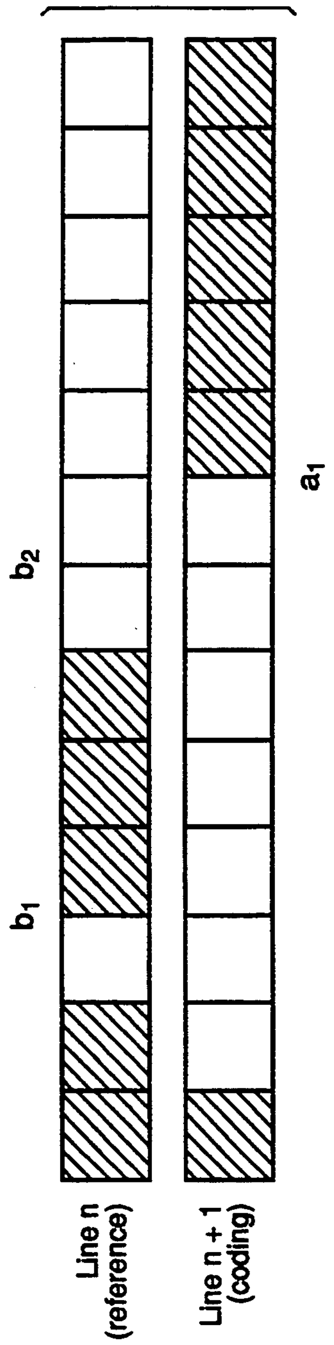
FIG. 2c Prior Art
Figure 3A:
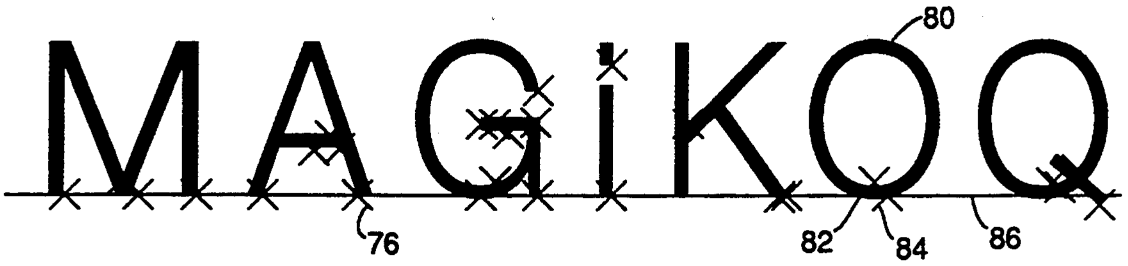
FIG. 3a Prior Art
FIGS. 3*a* and 3*b* illustrate the location of fiducial points based upon pass codes of the CCITT Group 4 compression standard on unskewed and skewed text, respectively.
Figure 3B:
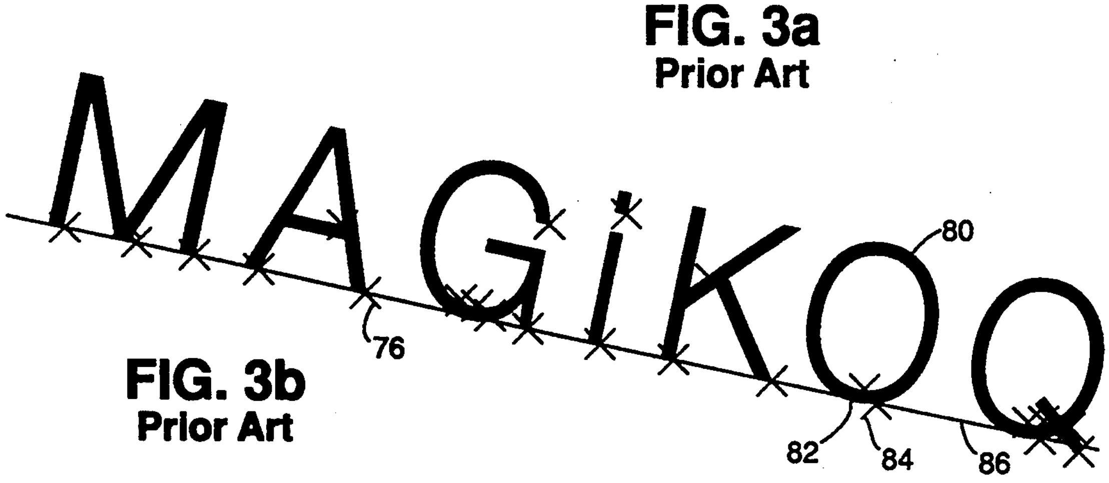
FIG. 3b Prior Art
Figure 4A:
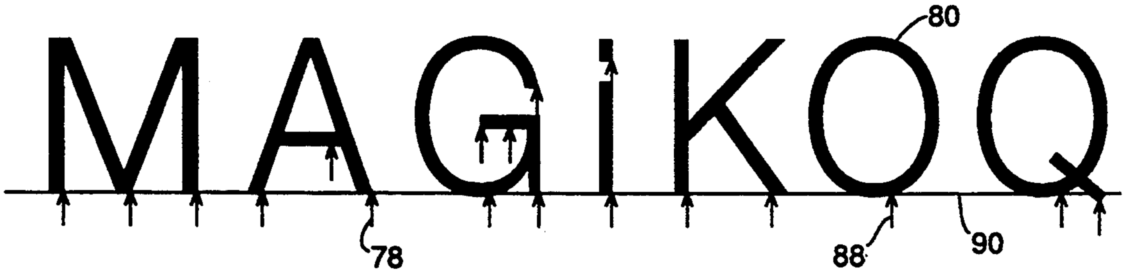
FIG. 4a Prior Art
FIGS. 4*a* and 4*b* illustrate the location of fiducial points based on white pass codes of the CCITT Group 4 compression standard, respectively.
Figure 4B:
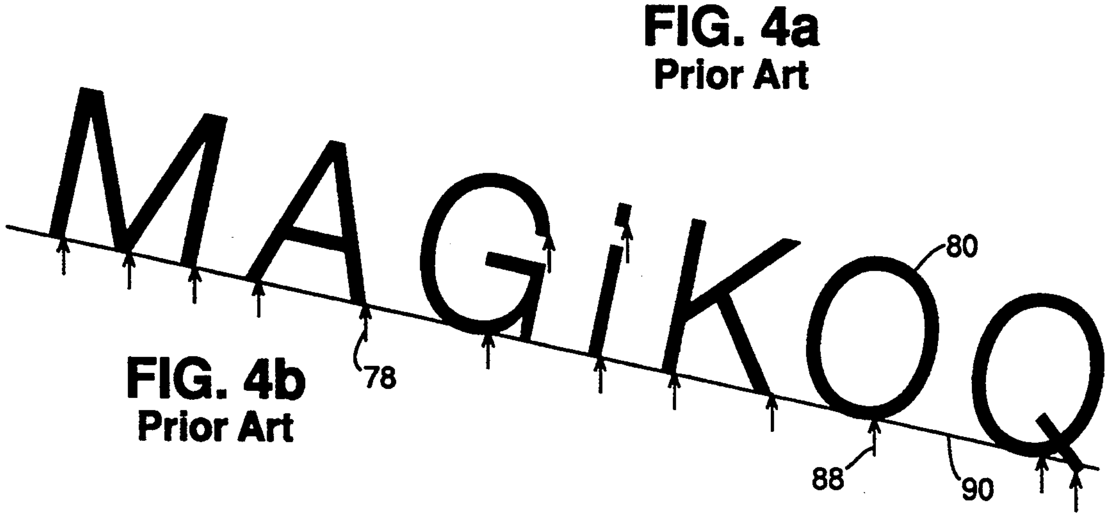
FIG. 4b Prior Art
Figure 5:
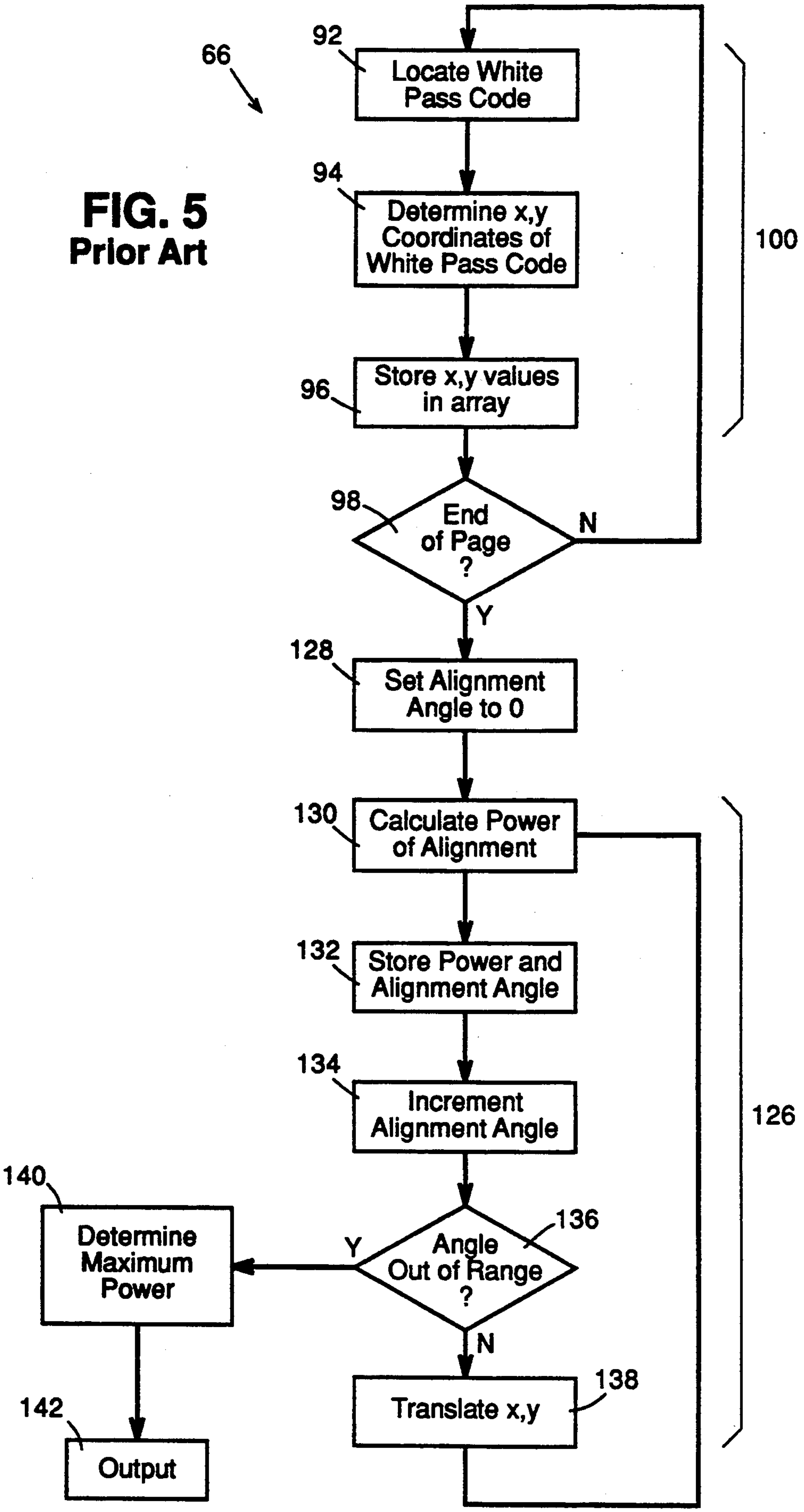
FIG. 5 Prior Art
FIG. 5 illustrates a known flow diagram that may be employed in the method of the present invention.
Figure 6:
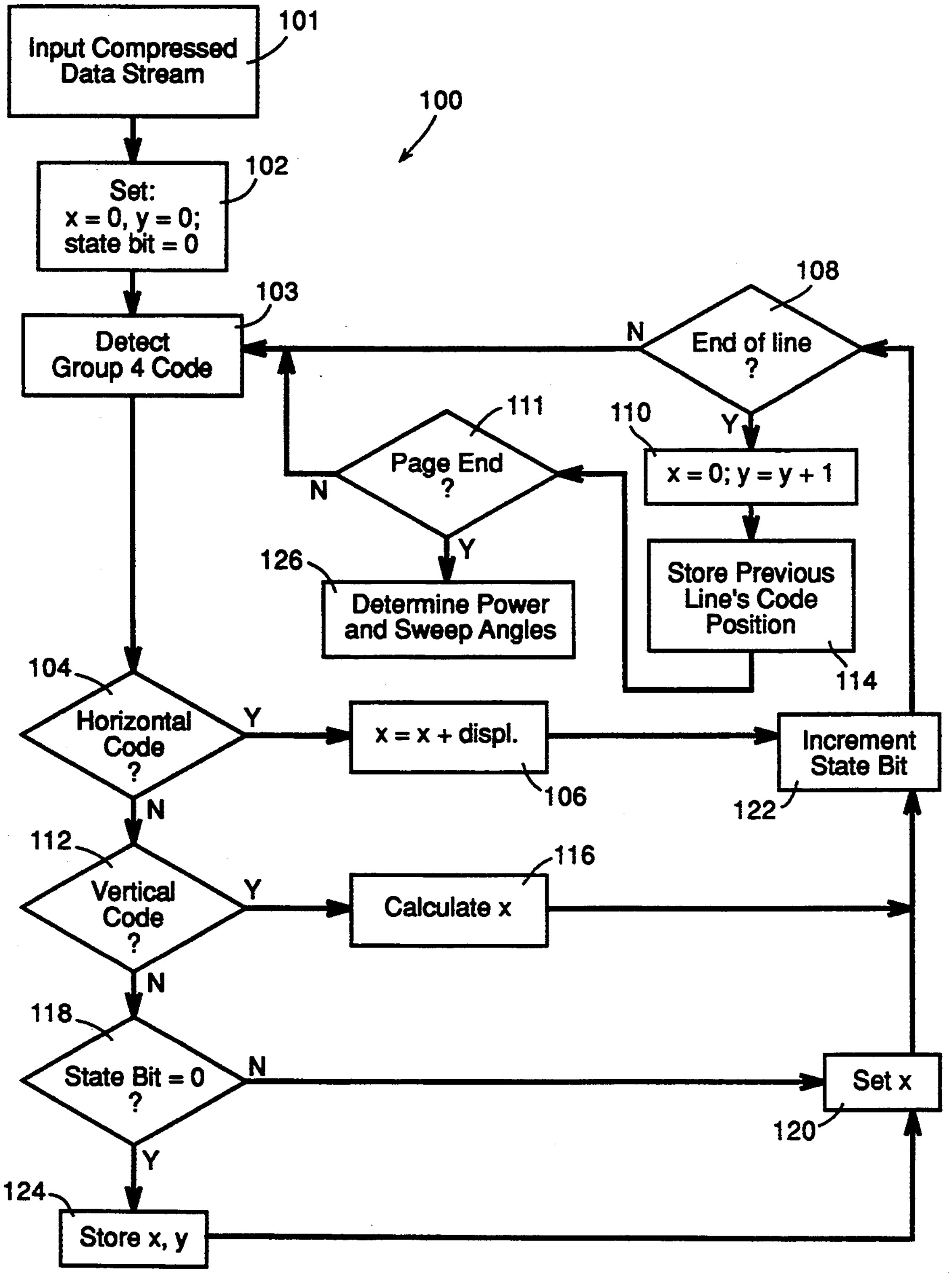
FIG. 6 Prior Art
FIG. 6 illustrates another known flow diagram that may also be used in the method of the present invention.
Figure 10:
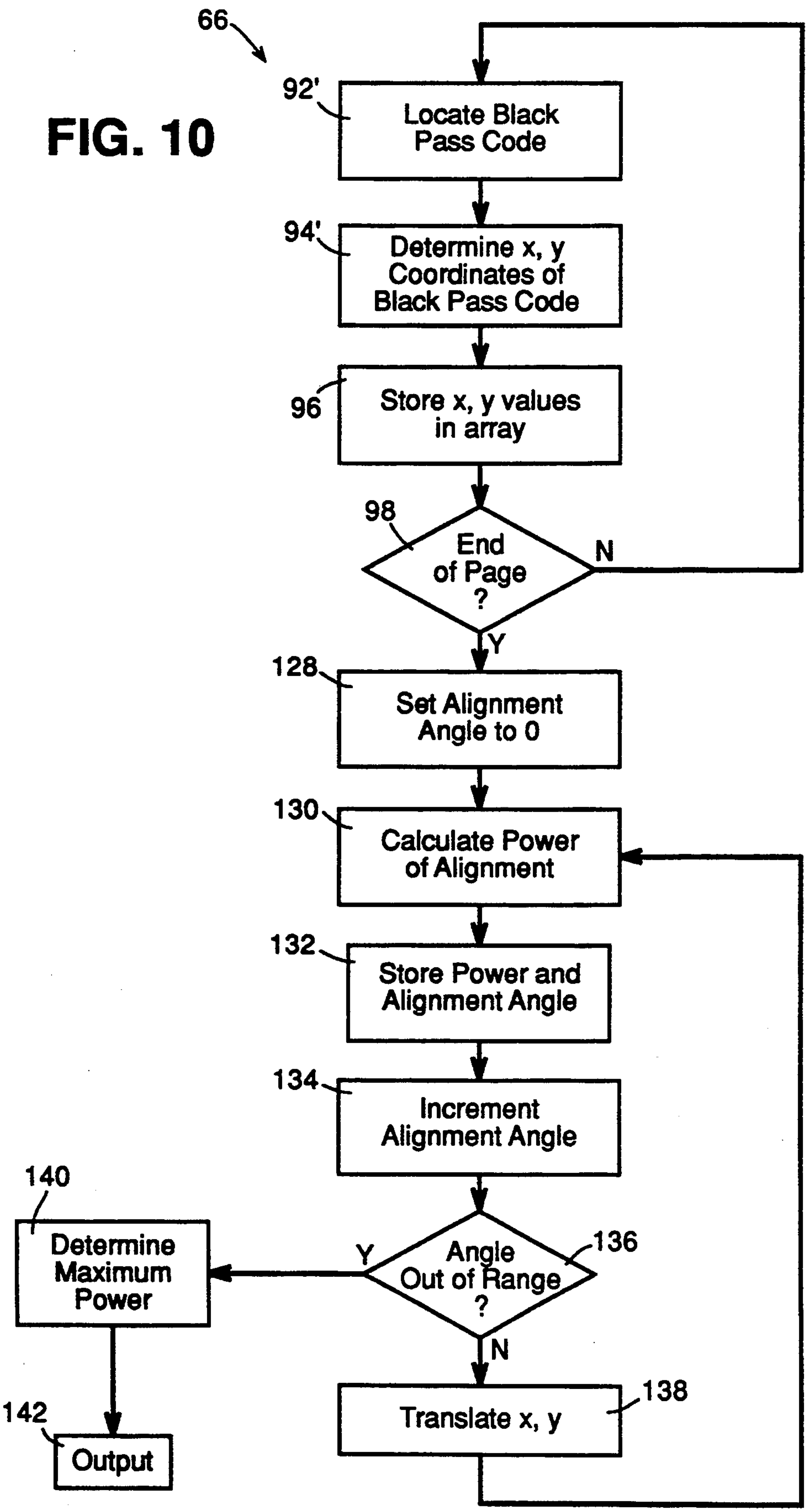
FIG. 10 is a flow diagram corresponding to the flow of FIG. 5, for detecting black passes.

The technique for finding the "power" of an alignment is basically the same as discussed in the copending patent application, with the exception that the power distribution is calculated for both white and black passes separately, in the present invention, and these distributions are concatenated into a single signature. The location of white passes was thus discussed with respect to the flow diagram of FIG. 5. A similar process, as shown in FIG. 10, may be employed to locate the black passes. The process of FIG. 10 differs from that of FIG. 5 only in that, in box 92', black pass codes are identified, and in box 94', the x,y values of the coordinates of the black pass codes are determined. As an example, in the determination of the black pass codes, the state bit may be initially set to 1, so that a value of 0 corresponds to black pass codes.

In the copending application, as discussed above, only the best alignment is used to characterize the skew angle of the document. In accordance with the present invention, however, the distribution of alignments, i.e. the signature, is used to classify the document.

It is desirable to construct the logotype from a large number of alignment structures, since the basic concept of the alignments arising from the deliberate placement, orientation and shape of a large number of alignment structures is statistically significantly stronger than those arising out of document which has few or no alignment structures. A larger number of alignment structures statistically increases detectability in the presence of noise, i.e. gives a higher signal to noise ratio. It is also desirable, if possible to locate the logotype at a specific location on a document, and to scan only this portion of the document for classification, since additional robustness arises from analysis of a single area of the page known to be the location of the logo, if present.

The method and apparatus of the invention can be advantageously implemented in real time, for example in facsimile service, i.e. at paper speeds on the order of one inch per second.

The signatures of the logotypes are constructed from the power vs angle data. Data are normalized to the number of passes. In the results tabulated here, the peak of the alignment distribution is sought in the range of +/−10 degrees, restricting the use of this implementation to situations where the cumulative rotation due to printing, copying and scanning artifacts is within that range. Once the peak is found, alignment signature data are calculated over a range of 45 degrees. This angular range is limited to reduce the likelihood of finding unintended alignments in the data. The alignment signature of the example of a logotype of FIG. 8 shows these peaks, as shown in FIG. 9.

The prototype logotype described here has four alignments, i.e. at 0, 12, 20 and 32 degrees. The 0 and 20 degree alignments are on the white passes generated at the bottoms of the alignment structures, and the 12 and 32 degree alignments are on the black passes generated near the tops of the alignment structures. Spatial coherence of pass locations might be used as an additional signature element, if desired.

Figure 11A:
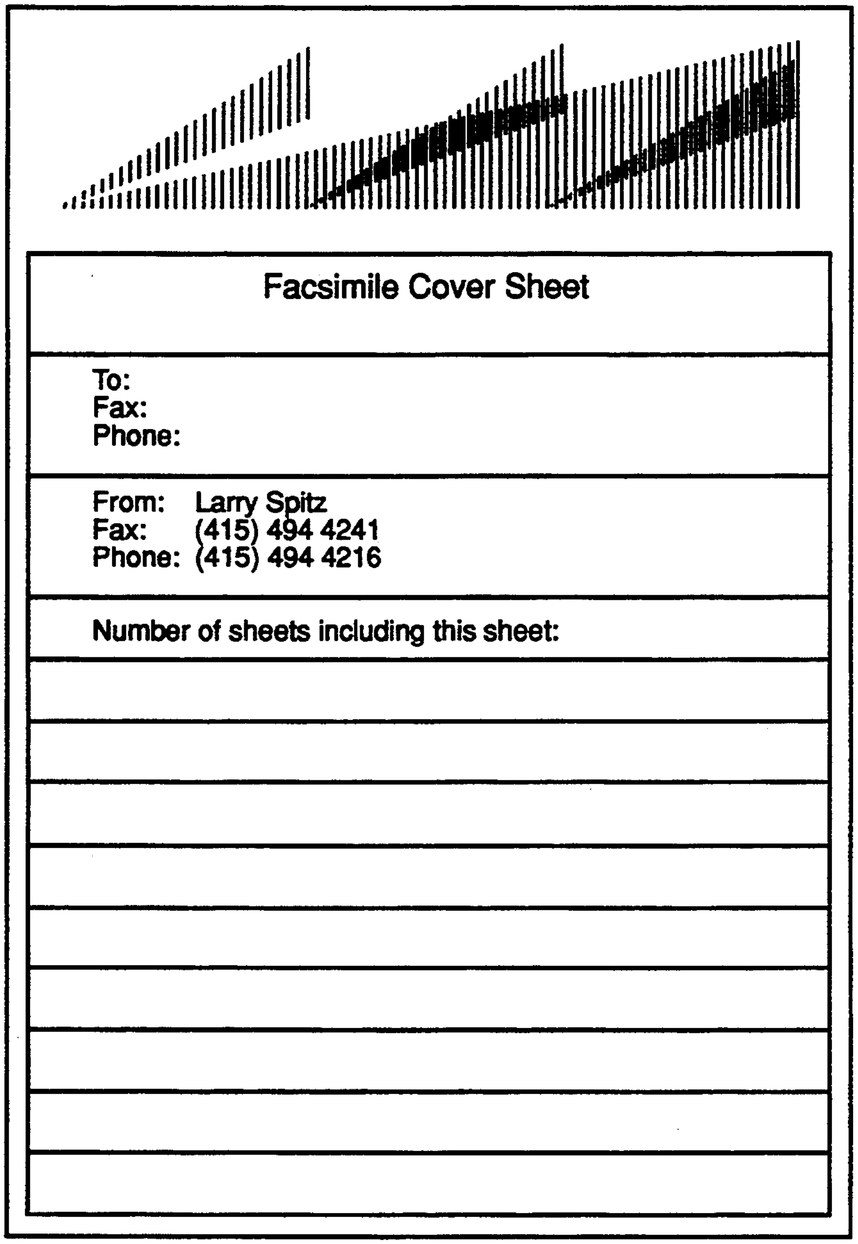
FIGS. 11*a* and 11*b* illustrate a facsimile sheet with a logotype in accordance with the invention, and the signature thereof, respectively.
Figure 11B:
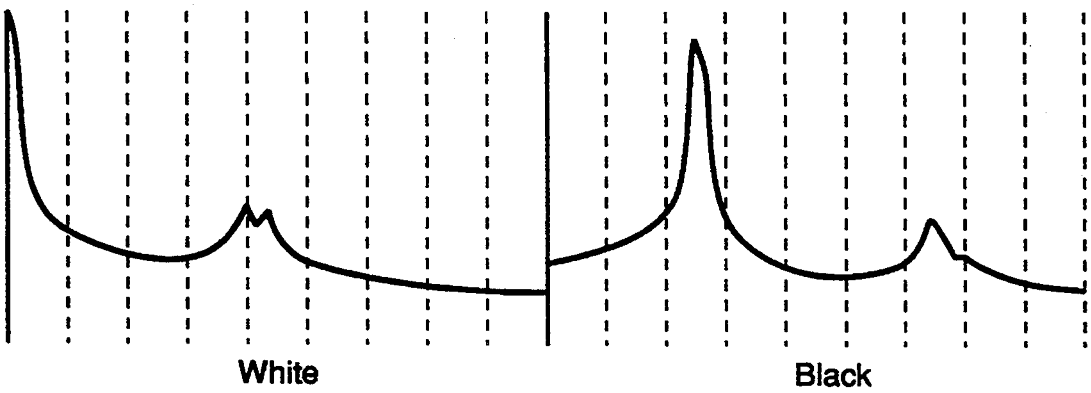
Figure 12A:
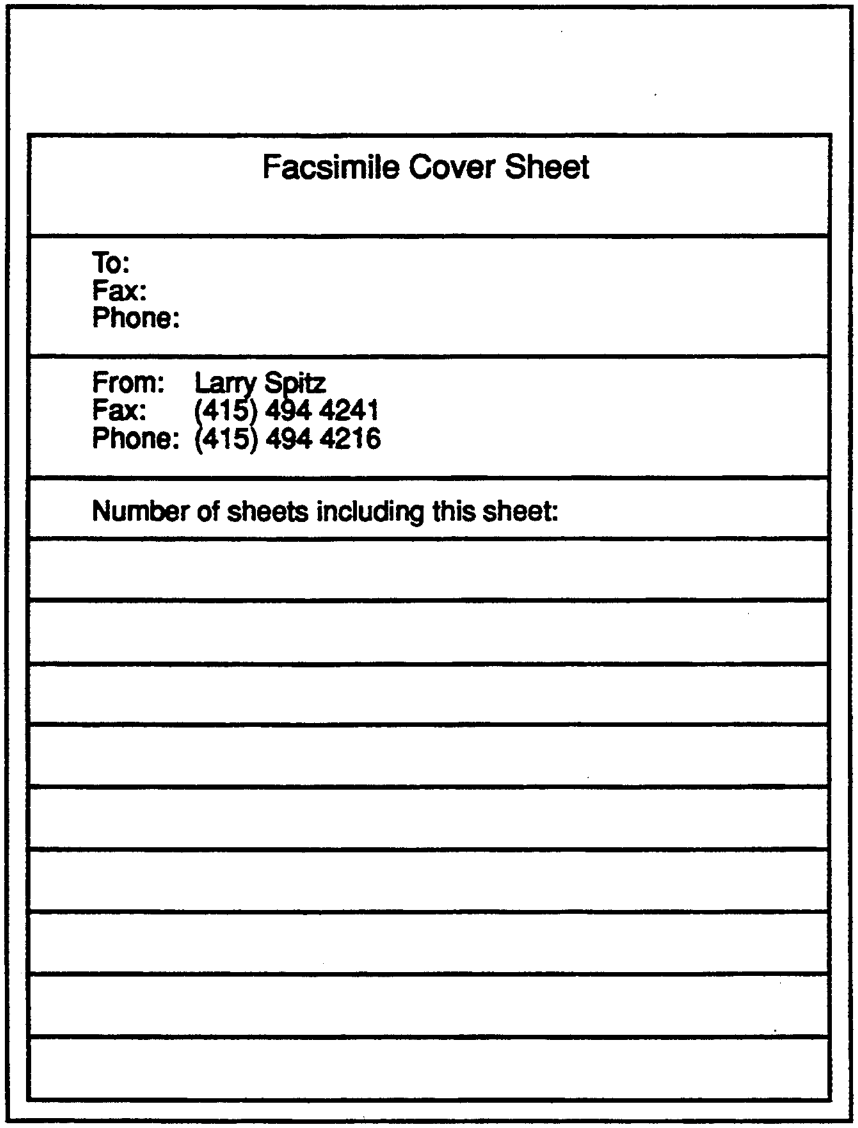
FIGS. 12*a* and 12*b* illustrate a facsimile sheet similar to that of FIG. 11*a* but without the logotype, and the signature thereof, respectively.
Figure 12B:
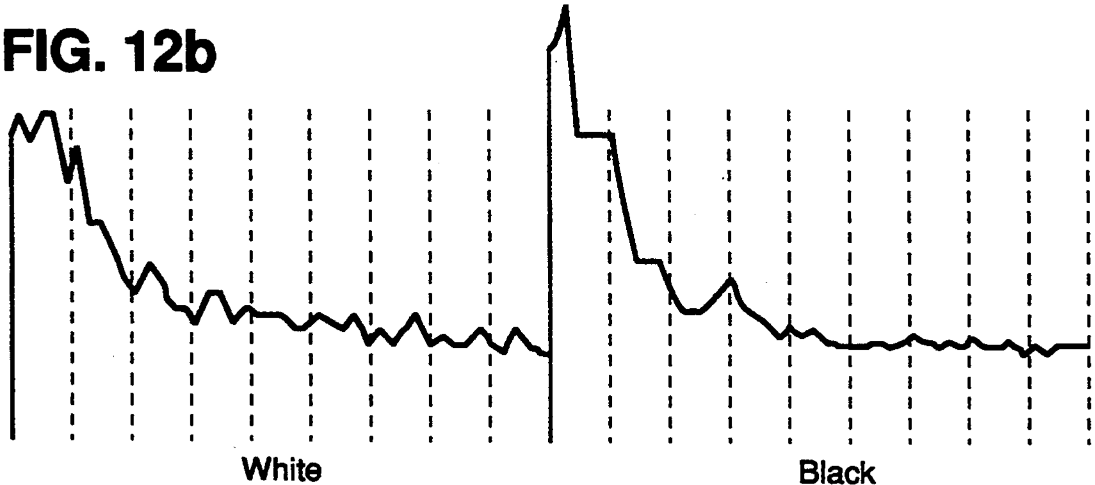

FIG. 11*a* illustrates one example of a facsimile cover sheet having a logotype thereon in accordance with the invention, and FIG. 12*a* illustrates a facsimile cover sheet that differs from that of FIG. 11*a* only in the absence of the logotype. The white pass and black pass signatures for these documents is illustrated in FIGS.

11*b* and 12*b*, respectively. A distinctive "signature" is clearly evident for the document of FIG. 11*a*, whereas such a "signature" does not result from the analysis of the document of FIG. 12*a*.

Logo detection is based on the statistics of the signature data computed from the power of the black and white pass codes over the range of alignment angles. One current implementation uses 46 angles for black and for white passes, giving a signature with 92 components. For the purposes of detection of a logotype, the logo may be declared to be present if the distance between the signature prototype and the document is less than a set threshold. The threshold distance value can be set experimentally, depending upon the importance of missing a logo relative to detecting a false logo.

It is necessary to have training documents which have both the desired signature and a sampling of the type of noise expected in the system. Such noise results from photocopying and skew angles of the document. The mean of training data is computed and is used as the signature prototype. The covariance matrix of the training documents, which provides information on the correlation between alignment angles, is also computed. The distance between the signature prototype and the document can either be a Euclidean distance, resulting from the fixed covariance matrix assumption, or a Mahalanobis distance, which weights the distance based on the covariance matrix.

An option to the use of an experimentally set threshold is to compute statistics of documents which do not contain the logo. The classification procedure then is the declaration that the logo is present if the distance, either Euclidean or Mahalanobis, to the mean vector for training data containing the logo was smaller than the distance to the mean vector of training data without the logo. It is also possible to assume a Gaussian distribution for the logo and for the non-logo data, establish prior probabilities for the presence and absence of the logo, set penalty weights for false detection and missed detection, and perform minimum risk classification.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A computer-implemented method for classifying a document comprising the steps:

(a) providing on the document a logotype distinctive of the classification of the document, said logotype comprising structures having alignment angles which generate a known and repeatable angular distribution of pass codes having at least two alignment peaks in said distribution, (b) machine scanning at least the portion of said document or a facsimile thereof containing the logotype to produce data signals corresponding to information on the document including the logotype, (c) subjecting the data signals obtained in step (b) to compression to obtain compressed data, (d) computer-processing said compressed data obtained in step (c) to produce information comprising pass codes in said compressed data and their distribution including angular locations thereof, (e) computer-processing the information obtained in step (d) to determine the power of an alignment angle of the locations of said pass codes produced in step (d) at a plurality of different alignment angles, (f) providing known powers of alignment angles of the locations of pass codes generated from different known logotypes each distinctive of a different document classification, (g) comparing said power determined in step (e) with said known powers of step (f) to find the closest match and to identify the classification of the document.

2. The method of claim 1, wherein the logotype is made up of a plurality of chevron-shaped structures.

3. The method of claim 1, wherein the logotype comprises three or more spatially ordered sets of alignment structures of at least two different angular alignments.

4. The method of claim 1, wherein step (d) is carried out to produce information comprising both white and black pass codes.

5. The method of claim 1, wherein the logotype comprises chevron structures producing peak powers at at least two different alignment angles when computer-processed according to step (e).

6. The method of claim 1, wherein step (c) is carried out by compressing the data signals in accordance with the CCITT Group 4 encoding standard.

7. The method of claim 5, wherein step (e) is carried out to obtain the distribution of peak powers as a function of alignment angle, and step (f) is carried out to provide the distribution of peak powers as a function of alignment angle for the known logotypes.

8. The method of claim 1, wherein step (c) is carried out by compressing the data signals in accordance with the CCITT Group 3 two-dimensional standard.

9. The method of claim 1, wherein the logotype comprises a first set of elements of increasing length extending from a first set end to an opposite second set end along a first direction, a second set of elements of increasing length extending along a second direction from the first set end of the first set, a third set of elements of increasing length extending along a third direction from a first point between the first and second set end of the first set.

10. The method of claim 9, wherein the second direction is at an angle of 45° with respect to the first direction.

11. The method of claim 9, further comprising a fourth set of elements of increasing length extending along a fourth direction from a second point between the first point and the second set end of the first set, said third and fourth sets overlapping with said first set.

12. An apparatus for classifying a document having a logotype thereon, the logotype being comprised of three or more sets of alignment structures of at least two different angular alignments that are unique to the classification of the document; said apparatus comprising:

means for scanning said document to produce data signals corresponding to information including the logotype on the document, computer means for compressing said data signals to form compressed data, computer means for identifying pass codes in said compressed data and the locations thereof, computer means for determining the distribution of the power of the alignment angles of the locations of said pass codes at a plurality of different alignment angles, means for comparing the distribution obtained from the logotype on the document with the corresponding distribution characteristic of known logotypes associated with each of said document classifications to determine the closest match and the document classification of said document.

13. The apparatus of claim 12, wherein said computer means for compressing said data signals comprises means for compressing signals according to the CCITT Group 4 or Group 3 two-dimensional encoding standard.

14. The apparatus of claim 12, wherein said computer means for determining the distribution of the power of the alignment angles of the locations of said pass codes comprises means for determining the distribution of the power of the alignment angles of the locations of both white and black pass codes.

* * * * *